(12) United States Patent
Recht et al.

(10) Patent No.: US 8,041,037 B2
(45) Date of Patent: Oct. 18, 2011

(54) CRYPTOGRAPHIC SYSTEM AND METHODS USING A ONE WAY MULTIDIMENSIONAL FUNCTION

(75) Inventors: Benjamin H. Recht, Cambridge, MA (US); Neil A. Gershenfeld, Somerville, MA (US); Ali Rahimi, Cambridge, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 1007 days.

(21) Appl. No.: 11/242,132

(22) Filed: Oct. 4, 2005

(65) Prior Publication Data

US 2006/0088164 A1    Apr. 27, 2006

Related U.S. Application Data

(60) Provisional application No. 60/615,829, filed on Oct. 4, 2004.

(51) Int. Cl.
*H04L 9/00* (2006.01)
(52) U.S. Cl. .................................. 380/263; 380/200
(58) Field of Classification Search .............. 713/153, 713/163, 183, 193, 340, 164, 150; 714/38, 714/49, 48, 35, 37; 726/22, 14, 13, 11, 34, 726/25, 26, 27; 380/42, 55, 58, 46; 375/346; 709/203, 217, 223, 237, 225, 229, 227
See application file for complete search history.

(56) References Cited

U.S. PATENT DOCUMENTS

| | | | |
|---|---|---|---|
| 5,664,016 A * | 9/1997 | Preneel et al. | 380/28 |
| 6,788,788 B1 * | 9/2004 | Kasahara et al. | 380/277 |
| 2003/0016770 A1 * | 1/2003 | Trans et al. | 375/346 |
| 2003/0086515 A1 * | 5/2003 | Trans et al. | 375/346 |
| 2004/0103325 A1 * | 5/2004 | Priebatsch | 713/202 |
| 2006/0062389 A1 * | 3/2006 | Mukherjee et al. | 380/256 |

OTHER PUBLICATIONS

American Mathematical Society, vol. 39, No. 1. pp. 1-49, "On the Mathematical Foundations of Learning", Felipe Cucker and Steve Smale published Oct. 5, 2001.
Advances in Computational Mathematics 13 (2000) pp. 1-50, "Regularization Networks and Support Vector Machines", Theodoros Evgeniou, Massimiliano Pontil and Tomaso Poggio, received Jan. 13, 1999.
Neural Computation 10, pp. 1455-1480 (1998) MIT, "An Equivalence Between Sparse Approximation and Support Vector Machines", Federico Girosi.
Advances in Computational Mathematics 10 (1999) pp. 51-80, "Generalization bounds for Function Approximation From Scattered Noisy Data", P. Niyogi and F. Girosi.
Neural Computation dated Feb. 1994, "On the Relationship Between Generalization Error, Hypothesis Complexity, and Sample Complexity for Radial Basis Functions", Partha Niyogi and Federico Girosi, pp. 1-24.
Thomas M. Cover & Joy A. Thomas, "Elements of Information Theory," John Wiley & Sons, Inc., 1991, pp. vii-xxii; 529-542.

(Continued)

*Primary Examiner* — Vivek Srivastava
*Assistant Examiner* — Nega Woldemariam
(74) *Attorney, Agent, or Firm* — Miles & Stockbridge P.C.

(57) ABSTRACT

A cryptographic method and systems using a keyed one-way function. A sending device uses the keyed one-way function to authenticate one or more receiving devices prerequisite to communication. A multidimensional hypercube is generated, from which is formed a multidimensional vector by randomly selecting one corner of the multidimensional hypercube. The keyed one-way function is computed using the multidimensional vector.

17 Claims, 5 Drawing Sheets

OTHER PUBLICATIONS

A. Pinkus, "n-Widths in Approximation Theory", Springer-Verlag, 1985, pp. 1-3.

V. N. Vapnik, "The Nature of Statistical Learning Theory", Springer, $2^{nd}$ ed., 2000, pp. 18-19; 235-236.

V. N. Vapnik & A.Y. Chervoenkis, "Necessary and Sufficient Conditions for the Uniform Convergence of Means to their Expectations", Teoriya Veroyatnostei I Ee Primeneiya (Theory of Probability and Its Applications), vol. XXVI, No. 3, 1981, pp. 532-553.

O. Goldreich, "Modern Cryptography, Probabilistic Proofs, and Pseudorandomness," Springer, New York, 1999, pp. 7, 8, 10, 23, 34, 51, 52, 81, 82, and 118.

* cited by examiner

CRYPTOGRAPHIC SYSTEM AND METHODS USING A ONE WAY MULTIDIMENSIONAL FUNCTION

This application claims the benefit of U.S. Provisional Application No. 60/615,829, filed Oct. 4, 2004, the entire disclosure of which is hereby incorporated by reference as if set forth fully herein.

The U.S. Government has a paid-up license in this invention and the right in limited circumstances to require the patent owner to license others on reasonable terms as provided for by the terms of Contract No. CCR0122419 awarded by the National Science Foundation (NSF) and Contract No. F30602-03-2-0090 awarded by the Advanced Research and Development Activity (ARDA).

BACKGROUND

1. Field of Invention

The present invention relates to the field of communications and, more specifically, to secure communications systems and methods.

2. Description of Related Art

Communications systems and methods that are secure from eavesdropping are highly desirable. Such secure communications systems encourage the use of communication systems because users may be assured that the information they exchange will remain private. Various cryptographic techniques have been developed to address secure communications. Such techniques often require estimation of arbitrary or random functions. However, the complexity and processing bandwidth required to estimate arbitrary functions increases exponentially as the dimension of the sample space grows.

Thus, there is a need for systems and methods to address these limitations as well as others readily discernable from review of this disclosure.

SUMMARY

Embodiments are directed generally to systems and methods for secure communications. Various embodiments can comprise cryptographic techniques for providing secure communications.

Various embodiments may be directed to a cryptographic method and system for forming a multidimensional vector from a random corner of a hypercube, providing the multidimensional vector to a receiver, computing a keyed one-way function using the multidimensional vector and a private key, receiving a response from the receiver, and comparing the received response to the computed one-way function.

BRIEF DESCRIPTION OF THE DRAWINGS

The utility, objects, features and advantages of the invention will be readily appreciated and understood from consideration of the following detailed description of the embodiments of this invention, when taken with the accompanying drawings, in which same numbered elements are identical and:

FIG. 3 is a top level functional block diagram of a cryptographic system according to various embodiments;

DETAILED DESCRIPTION

Figure 1:
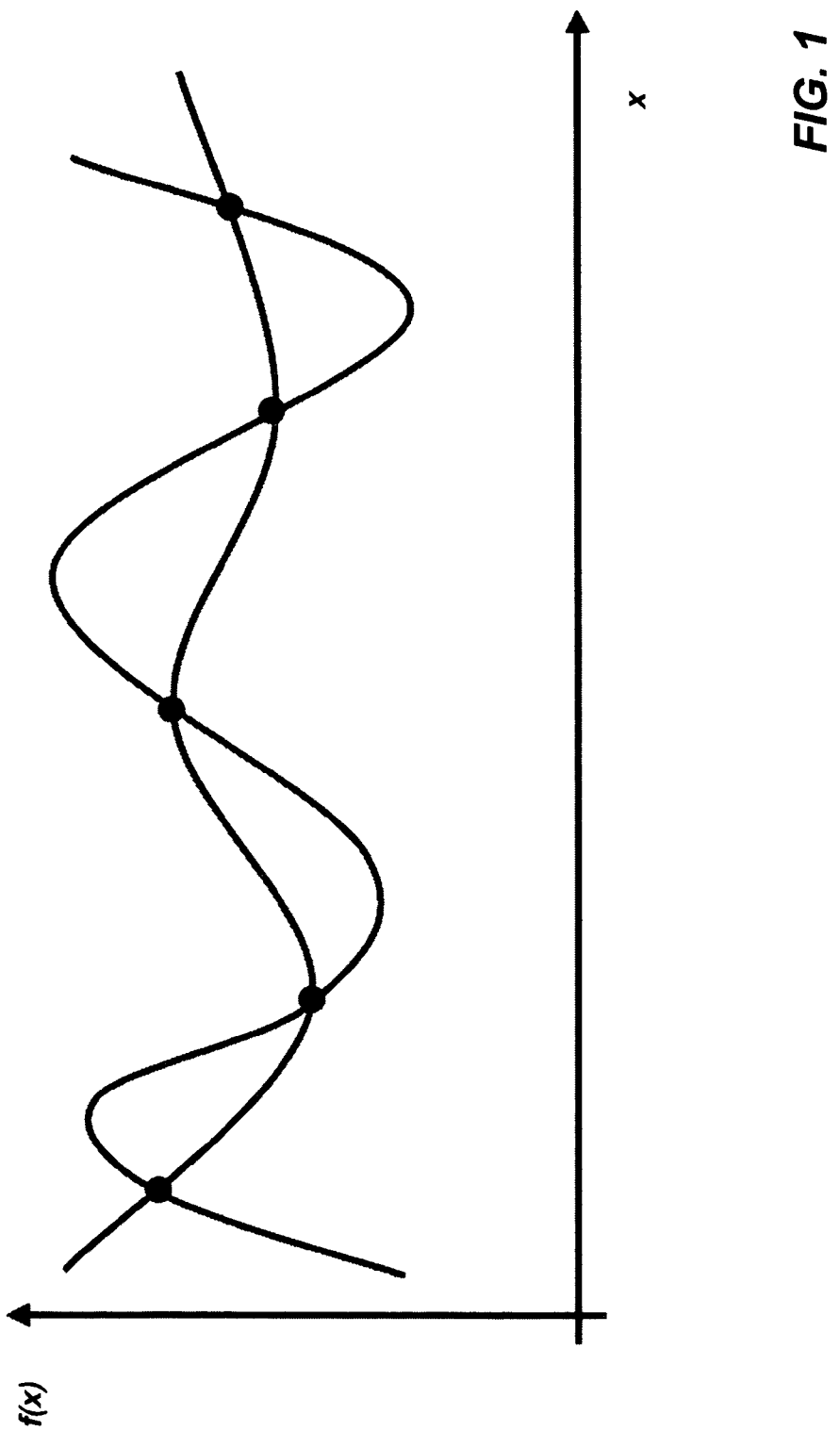
FIG. 1 is a graphical example of data over-fitting.

Embodiments are directed generally to cryptographic systems and methods. For example, the various embodiments can comprise generating and using fixed length keyed cryptographic one-way functions by exploiting the exponential complexity asymmetries in estimation theory and statistical regression that arise in high dimension. These asymmetries may include, for example, those occurring between function evaluation and function fitting, between parameter estimation and density estimation, and between set-membership testing and set separation. By framing cryptography in an estimation setting, various embodiments can use and apply powerful theorems from the field of statistics to ensure the intractability of attempts to defeat the cryptographic systems and methods discussed herein, in contrast to algebraic cryptographic protocols.

Various embodiments can comprise, for example, authentication schemes that use and apply such complexity asymmetries. For example, various embodiments can comprise general secure authentication schemes between a user and terminal, or between users of terminals or devices. Because of the relative simplicity of implementation, various embodiments can be implemented in embedded low complexity devices with relatively little computational overhead. Furthermore, various embodiments can comprise protocols that take advantage of physical sources of randomness for generating samples from the cryptographically secure distributions.

The inventors have discovered that in the field of statistical learning, bounds on the ability to approximate arbitrary functions imply a curse of dimensionality in which estimation can grow exponentially difficult as the dimension of the sample space grows; however, asymmetry in function fitting and function evaluation can be exploited to provide systems and methods comprising a fixed length keyed one-way function that can be implemented for secure communication such as, for example, secure authentication.

A. Function Fitting and the Bias-Variance Trade-Off

A one-way function is a mapping which may be computed efficiently but for which it is intractable to find an input giving rise to a fixed output. Further details regarding one-way functions may be obtained from, for example, O. Goldreich, "Modern Cryptography, Probabilistic Proofs, and Pseudorandomness," Springer, New York, 1999. In the language of approximation theory, a one-way function is a mapping of queries "q" to responses "r" where $r=f(q)$, such that given "N" query-response pairs $(q_1, r_1), \ldots, (q_N, r_N)$ and a new query $q_{N+1}$, it is intractable to determine $r_{N+1}$ to within a threshold, $\epsilon$.

A statistician would interpret this requirement to say that the regression problem for the function $f$ which maps q to r is intractable. Finding tractable means of calculating $f$ is the heart of all regression, classification, and generalization problems in statistics. For example, see V. N. Vapnik, "The Nature of Statistical Learning Theory," Springer, New York, 2nd edition, 2000, and F. Girosi, "An Equivalence Between Sparse Approximation and Support Vector Machines," Neural Computation, 10:1455-1480, 1998. In various embodiments, hard limits in function fitting may be exploited to find functions which are intractable to fit.

We can make the notion of function fitting precise as follows. Let X and Y be two spaces with distribution $\mu_{X \times Y}$ on their product. Given n pairs from X and Y, infer a functional mapping $f: X \rightarrow Y$ such that given a new sample from X we can predict the paired sample from Y. Mathematically, we define the risk of the function $f$ to be:

$$I[f] := \int (f(x)-y)^2 d\mu_{X \times Y}. \quad \text{Eq. (1)}$$

In Eq. 1, I[$f$] measures how much squared error on average we would see for a pair (x,y) drawn at random from X×Y. Since we are only able to infer $f$ from a finite set of data, we define the empirical risk as:

$$I_N[f] := \frac{1}{N} \sum_{i=1}^{N} (f(x_i) - y_i)^2. \quad \text{Eq. (2)}$$

Thus, $I_N[f]$ measures the error of $f$ on the data set we are presented.

The regression problem is to compute:

$$f* \arg \min_f I[f]. \quad \text{Eq. (3)}$$

This optimization problem is fraught with difficulty because the distribution $\mu_{X \times Y}$ is often unknown, and even when it is known, the optimization usually remains intractable. A solution is to find the minimizer of the empirical risk:

$$f*_N = \arg \min_f I_N[f]. \quad \text{Eq. (4)}$$

That is, to minimize the error only on the data that we have seen. Surprisingly, under very mild assumptions, $f*_N$ converges to $f*$ as N goes to infinity. The proofs of such convergence are essentially due to the law of large numbers. Additional information regarding this relationship is available from, for example, F. Cucker and S. Smale, "On the mathematical foundations of learning," Bulletin of the American Mathematical Society, 39(1): 1-49, 2001.

Unfortunately, there is no guarantee that $f$ can be written in closed form even if we know a priori that it is continuous. To make the problem computationally tractable, we must restrict the search for $f$ in a hypothesis space "H" such as, for example, the set of all cubic splines or the sum over a finite number of Parzen Windows. Further detail regarding Parzen Windows is available from, for example, T. Evgeniou, M. Pontil, and T. Poggio, "Regularization networks and support vector machines," Advances in Computational Mathematics, 13(1): 1-50, 2000. Let:

$$f*_H = \arg \min_{f \in H} I[f] \quad \text{Eq. (5)}$$

be the best we can do in the space H and let:

$$f*_{N,H} = \arg \min_{f \in H} I_N[f] \quad \text{Eq. (6)}$$

be the best we can do in H with only N examples. To keep track of all of the approximations we are making define the generalization error as:

$$\epsilon_{N,H} = I[f*_{N,H}] - I[f*] = (I[f*_{N,H}] - I[f*_H]) + (I[f*_H] - I[f*]) \quad \text{Eq. (7)}$$

With respect to Eq. 7 above, the first term in parentheses is called the "estimation error." It represents how much our regression function is skewed by partial data. The second term in parentheses is called the "approximation error." It measures how close we can get to the regression function by restricting ourselves to the hypothesis space, H. Further detail regarding these terms is available from, for example, P. Niyogi and F. Girosi, "On the relationship between generalization error, hypothesis complexity and sample complexity for radial basis functions," Neural Computation, 8:819-842, 1996, and P. Niyogi and F. Girosi, "Generalization bounds for function approximation from scattered noisy data," Advances in Computational Mathematics, 10:51-80, 1999. This splitting of the error into two parts is often referred to as the bias-variance trade-off. One can get low approximation error by having a rich hypothesis space, but then, on small data sets, over-fitting is inevitable and the estimation error is high. On the other hand, by fitting linear functions to data, the estimation error is quite low, but the class of functions that can be fit is fairly small. The approximation error amid estimation error must be balanced to guarantee low generalization error.

From the cryptographer's perspective, a one-way function is a distribution $\mu_X$ on X and a polynomial time computable function $f: X \rightarrow Y$ such that the generalization error is greater than a constant for any choice of hypothesis space. In various embodiments, this can be achieved by making the dimension of the space X large enough, as described herein.

B. The Curse of Dimensionality

The inspiration for intractability comes from the principle of sampling. Given a continuous function which we want to digitize (or convert to a digital function), Nyquist's sampling theorem requires that we must sample at a rate that is twice as fast as the highest frequency in the signal we wish to reconstruct. If the function is defined over "d" variables, the number of samples required for perfect reconstruction is $N^d$. On the other hand, it is often quite easy to compute high dimensional functions. For example, dot products in "d" dimensions can be calculated in O(d) steps. This is an inherent asymmetry: function evaluation can scale linearly while the difficulty of function fitting and reconstruction can scale exponentially.

The first appearance of the curse of dimensionality can arise because of the exponential number of coefficients required to specify the Fourier series of high dimensional functions. Suppose we want to estimate $f: R^d \rightarrow R$ using Taylor polynomials:

$$f(x) = \sum_{\omega \in \mathbb{Z}^d_+} c_\omega \exp(i\omega^T x) \quad (8)$$

If we approximate $f$ with all Taylor coefficients such that $w_i < l$, i.e., with $$f_l(x) = \sum_{\omega \in \mathbb{Z}^d_+, \omega_i \leq l} c_\omega \exp(i\omega^T x) \quad (9)$$

the approximation error is $$\epsilon_n = \|f(x) - f_l(x)\|^2 = \quad (10)$$

$$\sum_{\omega \in \mathbb{Z}_+^d, \omega_i > l} c_\omega^2 = \sum_{\omega \in \mathbb{Z}_+^d, \omega_i > l} c_\omega^2 \frac{\sum_{i=1}^d \omega_i^2}{\sum_{i=1}^d \omega_i^2} \le \frac{1}{dl^2} \sum_{\omega \in \mathbb{Z}_+^d, \omega_i > l} c_\omega^2 \frac{\sum_{i=1}^d \omega_i^2}{\sum_{i=1}^d \omega_i^2} \le$$

$$\frac{1}{dl^2} \sum_{\omega \in \mathbb{Z}_+^d} c_\omega^2 \sum_{i=1}^d \omega_i^2 = \frac{\|\nabla f\|^2}{dl^2}$$

since the number of parameters is $n=l^d$, we have $$\epsilon_n \le \frac{\|\nabla f\|^2}{d} n^{-\frac{2}{d}} \quad (11)$$

or, to achieve an estimation of quality c, the number of parameters satisfies $$n \ge \left[ \frac{\|\nabla f\|^2}{\epsilon d} \right]^{\frac{d}{2}} \quad (12)$$

From the foregoing, it is shown that the number of parameters is exponential in the desired precision. It turns out that this rate is optimal whether or not Fourier series are used as the approximating functions. Further details regarding this relationship are available from, for example, A. Pinkus, "N-widths in approximation theory," Springer, New York, 1985. The above discussion also shows that the Fischer information, which is the quantity which determines how much one can learn about non-random parameters in a probability distribution, vanishes exponentially as the dimension grows. Further details regarding Fischer information are available from, for example, M. Cover and J. A. Thomas, "Elements of Information Theory," Wiley, New York, 1991.

Furthermore, errors in estimation can occur because in high dimensions there are exponentially many functions which precisely fit the given data but do not generalize to unseen data. This phenomenon is called over-fitting. For example, suppose we are given samples $x_i$ sampled uniformly from the d-dimensional unit cube $\{-1, 1\}^d$ and values:

$$y_i = \sin(\omega_0^T x + \phi_0) \quad \text{Eq. (13)}$$

with $\omega_0 \in \mathbb{R}^d$ and $\phi_0 \in [0, 2\pi]$. It is well known that the estimation error of this class of functions cannot be bounded; see, for example, V. N. Vapnik and A. Y. Chervonenkis, "The necessary and sufficient conditions for the uniform convergence of averages to their expected values," Teoriya Veroyatnostei i Ee Primeneniya, 26(3):543-564, 1981. However, we can heuristically discuss why predicting responses from queries is intractable. For example, if we search over functions of the form $f(x)=\sin(\omega^T x+\phi)$, it is clear that more than one $(\omega, \phi)$ pair can fit a particular sample point in the data. For example, let $\alpha_i = \arcsin(y_i)$. Then, we must have for some integers $k_i$ that $$\omega^T x_i + \phi = \begin{cases} 2\pi k_i - \alpha_i & k_i \text{ odd} \\ 2\pi k_i + \alpha_i & k_i \text{ even} \end{cases} \quad (14)$$

This over-fitting characteristic is illustrated in FIG. 1. With respect to FIG. 1, there is shown a set of sampling points (for example, the black dots) representing pairs of points sampled from an unknown distribution and function. Both curves fit the data and are equally smooth. This sort of over-fitting grows exponentially worse with increasing dimension. Because there are two choices for each data point, the number of bad assignments of parameters which exactly fit the data is exponentially large. Therefore, it is unlikely that any algorithm will extract the correct assignment.

From the above discussion it is clear that the difficulty of almost any functional approximation problem grows exponentially with the dimension of the domain. In turn, even the deceptively simple looking problem of finding the parameters of:

$$f(x;\omega,\phi) = \sin(\omega^T x + \phi) \quad \text{Eq. (15)}$$

is exponentially difficult in the dimension of x. That is, $f$ is a keyed one-way function. Knowledge of the parameters $\omega$ and $\phi$ allow one to compute the function, but it is impossible to predict fix $f(x; \omega, \phi)$ from a small set of data.

Figure 2:
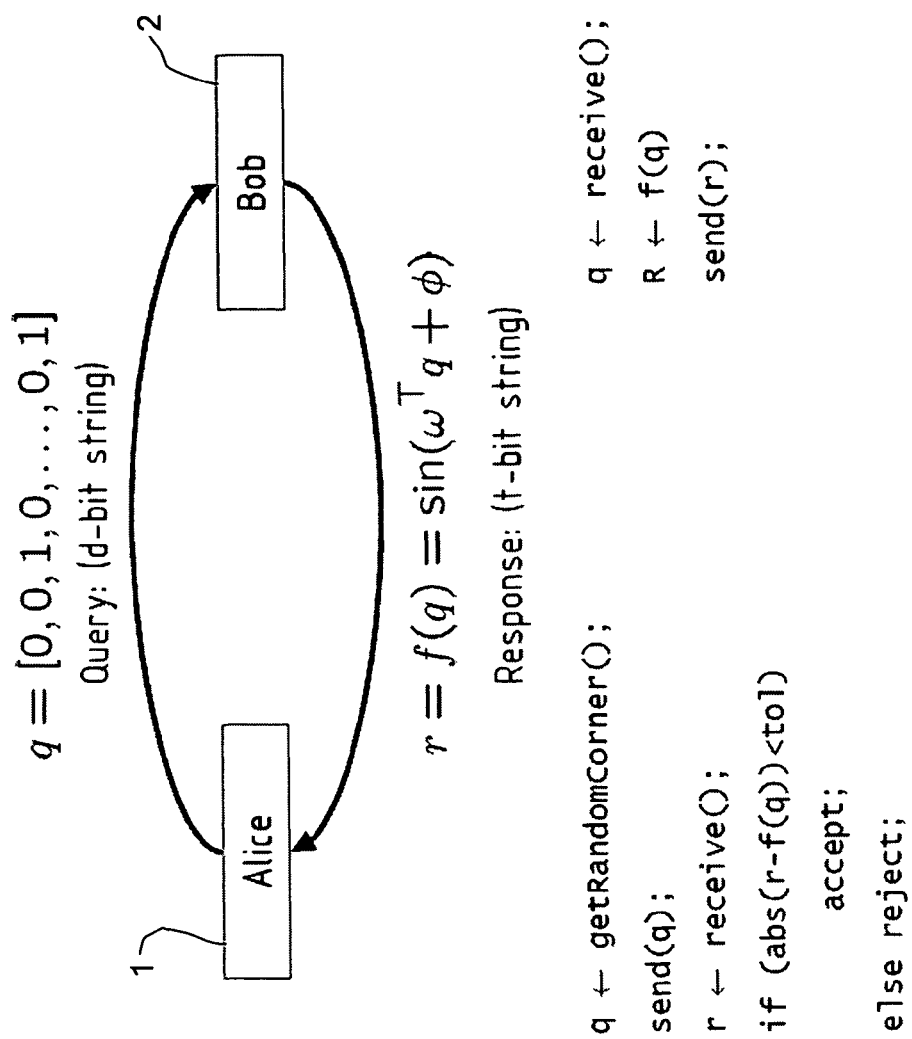
FIG. 2 is a flow diagram of a cryptographic method according to various embodiments.

With respect to FIG. 2, there is shown a cryptographic method in accordance with various embodiments. As shown in FIG. 2, the cryptographic method can comprise an authentication scheme using $f$ in which a sender 1 (for example, "Alice"), and a receiver 2 (for example, "Bob"), each share a private key $(\omega, \phi)$ of $(d+1)*N$ bits with $\omega > M$, where M is some predetermined constant, and $\omega \in [-\pi, \pi]$. When the sender Alice desires the receiver Bob to authenticate, Alice can send Bob a query in the form of a d-dimensional vector, q. In various embodiments, q can be set to a random corner of the d-dimensional hypercube. Thus as shown in FIG. 2, q can comprise a string or vector of length d bits. Bob can then compute a response $r=f(x; \omega, \phi)$ and send the first t bits of the response to Alice. Alice can then compare the response received from Bob to her expected result based on her own computation of $f(x; \omega, \phi)$.

From the discussion above, it is shown that an eavesdropper cannot predict function $f$ values even if the would-be eavesdropper had seen half of the $2^d$ possible query response pairs. For d=128, for example, the cryptographic method can provide $10^{18}$ queries with no compromised security.

Thus, in various embodiments, a processor can be configured for example, but not limited to, using a sequence of programmed instructions to calculate $f$ by computing the dot product $\omega^T x + \phi$ modulo some preset phase maximum. Secure communications can then be accomplished using a simple multiply accumulate step and a logical "AND" with a bit mask, requiring low processing bandwidth. Various embodiments can comprise a processor thus configured to compute f. Such embodiments can comprise, for example, but not limited to, a personal computer, a laptop computer, a wireless device, a wireless handset, a cellular telephone or terminal, a communications module or terminal, or other computing device including a lightweight computing device. In alternative embodiments, sawtooth waves can be used in the keyed one-way function, $f$, instead of sine waves without impact to the degree of security provided. A sawtooth wave is a superposition of sine waves with harmonic frequencies.

As shown in FIG. 2, in various embodiments a processor can be configured to execute a sequence of programmed instructions that cause the processor to perform the methods as described herein. For example, a sender 1 can be configured to execute the following sequence of programmed instructions:

q←getRandomCorner( )
send(q);
r←receive( )
if (abs(r−f(q))<tol)
　accept;
else reject;

Further, a receiver 2 can be configured to execute the following sequence of programmed instructions:
q←receive( )
R←f(q);
Send(r);

With respect to FIG. 3, there is shown a top level functional block diagram of a cryptographic system 10 according to various embodiments. As shown in FIG. 3, the cryptographic system 10 can comprise a sender 11 and a receiver 12. The sender 11 and the receiver 12 can communication using a network 13. In various embodiments, the sender 11 and the receiver 12 can each comprise a computing device such as, but not limited to, a Personal Computer (PC), which may be a desktop or a laptop PC, a Portable Digital Assistant (PDA), cell phone or handset, or wireless device or terminal, as previously described.

In various embodiments, the cryptographic system 10 can comprise a single sender-receiver pair or multiple sender-receiver pairs, or a group of senders and receivers, with each pair or group being associated with a common keyed one-way function as described hereinabove and vector, q, and private key ($\omega$, $\phi$).

The sender or sending device 11 can comprise a key manager 21, a vector generator 22, a keyed one-way function generator 23, a comparator 25, and a communication module 27. The key manager 21 and the vector generator 22 can be coupled to the keyed one-way function generator 23 to provide the private key and vector q, respectively, to the keyed one-way function generator 23. The vector generator 22 can be coupled to the communication module 27 to send the vector q to the receiving device 12. The comparator 25 may be coupled to the keyed one-way function generator 23 and the communication module 27 for receiving the computed function f(q) and a received response, r, respectively. The vector generator 22 can be coupled to the communication module 27 to send the vector q from the sending device 11 to the receiving device 12.

The receiver or receiving device 12 can comprise the key manager 21, the keyed one-way function generator 23, a response generator 24, and the communication module 27. The key manager 21 and the communication module 27 can be coupled to the keyed one-way function generator 23 for receiving the private key and the vector q, respectively. The response generator 24 can be coupled to the keyed one-way function generator 23 for receiving the response, r, and to the communication module 27 for sending the response r from the receiving device 12 to the sending device 11.

In various embodiments, the network 13 can comprise a wired or wireless network such as, but not limited to, a Local Area Network (LAN), Wide Area Network (WAN), RS-232, Universal Serial Bus (USB), Institute of Electrical and Electronics Engineers (IEEE) 1394 Firewire™, or other such private network, or a public-switched network such as the Internet, satellite, wireless, Radio Frequency (RF), the Public Switched Telephone Network (PSTN), another packet-based network, or any other electronic or optical communication medium.

In various embodiments, the key manager 21 can select a private key comprising a ($\omega$, $\phi$) pairing. For example, co can comprise a random vector, which may be a binary vector, and $\phi$ can comprise a phase. In various embodiments, the key manager 21 can comprise a sequence of programmed instructions that when executed cause a processor to select the private key. In various alternative embodiments, the key manager 21 can comprise a hardware module such as a card or a microcircuit device configured to perform these operations. In various embodiments, the private key can be prepositioned at the receiver 12. For example, the key manager 21 can obtain one or more private keys from local memory. The key manager 21 can maintain multiple private keys each corresponding to a different sender-receiver pair or group.

In various embodiments, the private key can be obtained or assigned from a key management system 14 provided in communication with the sending device 11. Alternatively, the key manager 21 can generate the private key using a random number generator algorithm.

In various embodiments, the vector generator 22 can form a vector, q, by selecting a random corner of a hypercube. In various embodiments, the vector q can comprise a multidimensional vector. For example, the vector q can comprise a binary vector of "d" dimension. In various embodiments, selection of the corner of the hypercube can be obtained using a random physical process such as, for example, atmospheric radio noise. In various embodiments, the vector generator 22 can also generate the hypercube of "d" dimensions. In various embodiments, the vector generator 22 can comprise a sequence of programmed instructions that when executed cause a processor to be configured to generate the vector, q, as described above. In various alternative embodiments, the vector generator 22 can comprise a hardware module such as a card or a microcircuit device configured to perform these operations.

In various embodiments, the keyed one-way function generator 23 can calculate a keyed one-way function using the private key ($\omega$, $\phi$) and the vector, q, modulo a predetermined phase maximum. In various embodiments, the function calculated by the keyed one-way function generator 23 can be, for example:

$$f(q) = \sin(\omega^T q + \phi) \qquad \text{Eq. (16)}$$

In various embodiments, the keyed one-way function generator 23 can comprise a sequence of programmed instructions that when executed cause a processor to be configured to compute the keyed one-way function as described above. In various alternative embodiments, the keyed one-way function generator 23 can comprise a hardware module such as a card or a microcircuit device configured to perform these operations.

In various embodiments, the response generator 24 can compute a response, r, using the keyed one-way function and the private key ($\omega$, $\phi$) and the received vector, q, modulo a predetermined phase maximum. In various embodiments, the response calculated by the response generator 24 can be, for example:

$$r = f(q) = \sin(\omega^T q + \phi) \qquad \text{Eq. (17)}$$

In various embodiments, the response generator 24 can comprise a sequence of programmed instructions that when executed cause a processor to be configured to compute the response as described above. In various alternative embodiments, the response generator 24 can comprise a hardware module such as a card or a microcircuit device configured to perform these operations.

In various embodiments, the comparator 25 can determine if a received response matches the expected response computed using the keyed one-way function and the private key. For example, the comparator 25 can perform a bit-by-bit compare of the response, r, and a locally computed one-way function f(q). In various embodiments, the comparison can use the first "t" bits of the response, r. In various embodiments, the comparator 25 can comprise a sequence of programmed instructions that when executed cause a processor to be configured to determine a correct response as described above. In various alternative embodiments, the comparator 25 can comprise a hardware module such as a card or a microcircuit device configured to perform these operations.

In various embodiments, the communication module 27 can provide the vector q from the sending device 11 to the receiving device 12. The communication module 27 can also receive the response r at the sending device 11 from the receiver 12. In various embodiments, the receiving device 12 can send the first "t" bits of the response, r, to the sending device 11. In various embodiments, the communication module 27 can comprise a sequence of programmed instructions that when executed cause a processor to be configured to send the vector q and receive the response r as described above. In various alternative embodiments, the response generator 24 can comprise a hardware module such as a card or a microcircuit device configured to perform these operations.

In various embodiments, f(q) can be any sinusoidal or sinusoidally-derived function, such as a sine wave or a sawtooth wave. Further, in various embodiments, the vector, q, can comprise a multidimensional vector based on random corners of a hypercube.

As shown in FIG. 3, in various embodiments, the sending device 11 and the receiving device 12 can comprise a cryptographic application 20. In various embodiments, the cryptographic application 20 can comprise a sequence of instructions that cause a processor to be configured to operate in one or more of at least two modes of operation. For example, the cryptographic application 20 may permit a user to operate a computing device as a sending device 11 in a sending mode. In this mode, the cryptographic application 20 may comprise instructions to configure the sending device 11 to perform the sending device 11 operations performed by the key manager 21, vector generator 22, keyed one-way function generator 23, comparator 25, and communication module 27. Further, the cryptographic application 20 may permit a user to operate the computing device as a receiving device 12 in a receiving mode. In this mode, the cryptographic application 20 may comprise instructions to configure the receiving device 12 to perform the receiving device 12 operations performed by the key manager 21, keyed one-way function generator 23, response generator 24, and communication module 27. In various embodiments, a single computing device may be configured to operate as a sending device in one sender-receiver pair or group and as a receiving device in a second sender-receiver pair or group. Further, each computing device can operate as a sending device for more than one sender-receiver pair or group or as a receiving device for more than one sender-receiver pair or group, or any combination thereof, provided a unique private key is used for each distinct pair or group.

Figure 4:
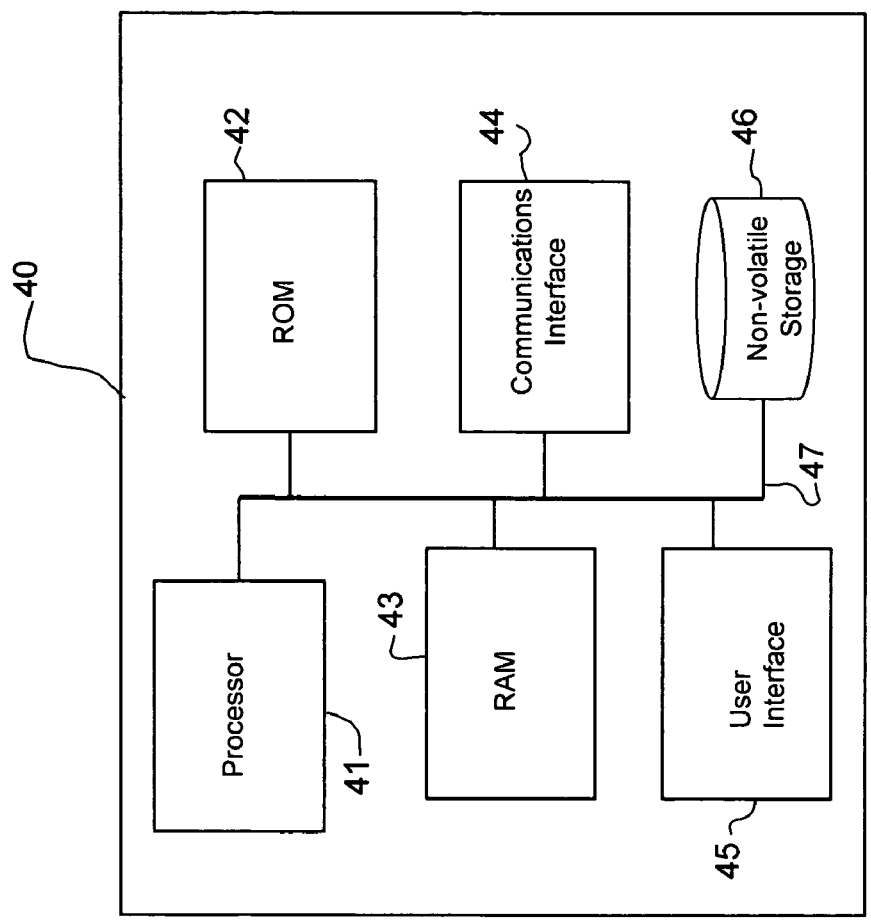
FIG. 4 is a functional block diagram of a computing device according to various embodiments.

With respect to FIG. 4, there is shown a schematic block diagram of a computing device 40 according to various embodiments. As shown in FIG. 4, the computing device 40 can comprise a processor 41, Read Only Memory (ROM) 42, Random Access Memory (RAM) 43, a communications interface 44, a user interface 45, and non-volatile storage 46. Each of these components may be coupled using a bus 47. In various embodiments, the non-volatile storage 46 can be a hard disk drive or other non-volatile storage device such as, for example, a memory stick or USB-accessible storage device such as an external hard disk drive or a floppy disk drive. Programmed instructions can be stored or maintained in non-volatile storage 46, ROM 42, or a combination thereof, which together or separately can comprise a computer-readable storage medium, or may be received from a network via the communications interface 44. Instructions may be loaded into RAM 43 and/or various processor registers for execution by the processor 41. When executed by the processor 41, the instructions can cause the processor 41 and computing device 40 to be configured to perform operations specified by the instructions. The computing device 40 can comprise a standard set of peripherals such as, but not limited to, a display, printer, keyboard, and mouse device accessible via the user interface 45.

Figure 5:
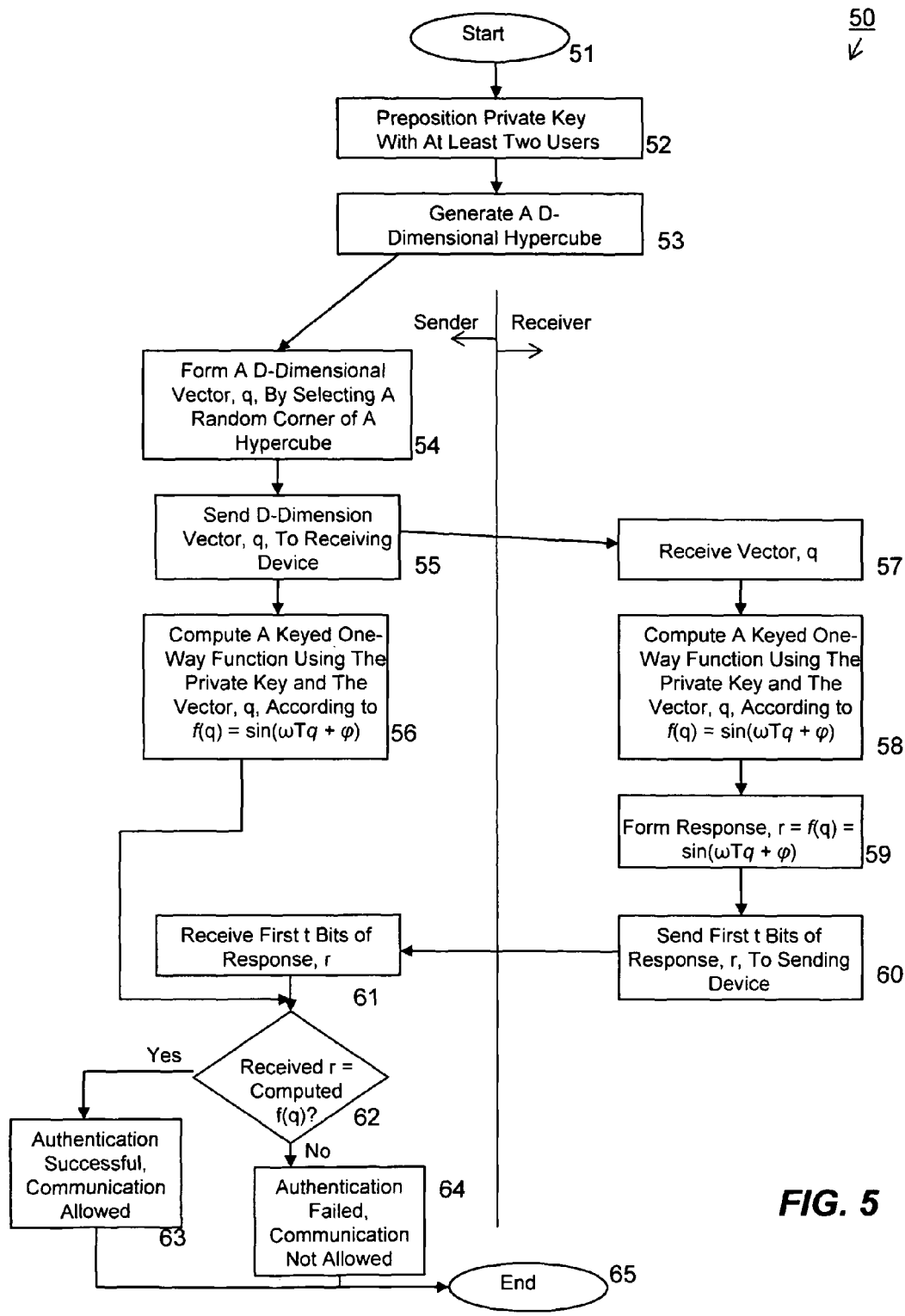
FIG. 5 is a flow chart of a cryptographic method according to various embodiments.

With respect to FIG. 5, there is shown a cryptographic method 50 according to various embodiments. As shown in FIG. 5, the cryptographic method 50 can commence at 51. Control can then proceed to 52, at which one or more private keys can be prepositioned at least one sending device and receiving device pair. Control can then proceed to 53, at which the sending device can generate a d-dimensional hypercube.

Control can then proceed to 54, at which the sender or sending device can form a multidimensional vector from a random corner of a hypercube. Control can then proceed to 55, at which the sender can provide or send the multidimensional vector to a receiver. Control can then proceed to 56 and 57. At 56, the sender can compute a keyed one-way function using the multidimensional vector and a private key.

At 57, the receiving device or receiver can receive the multidimensional vector q from the sender. Control can then proceed to 58, at which the receiver can compute a keyed one-way function using the multidimensional vector received from the sender, and the private key. Control can then proceed to 59, at which the receiver can form a response using the keyed one-way function and private key. Control can then proceed to 60, at which the receiver can provide or send the response, r, to the sender. In an embodiment, the receiver can send only the first "t" bits of the response r.

At 61, the sender can receive the response, r, from the receiver. Control can then proceed to 62, at which the receiver can compare the received response from 61 to the locally computed one-way function at 56. If the comparison indicates a match condition, then control can proceed to 63, at which the sender 11 can register a successful authentication condition and permit further communication. If the comparison indicates that a match has not occurred, then control can proceed to 64, at which the sender 11 can register a failed authentication condition and prohibit further communication. Control can then proceed to 65, at which a method can end.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

What is claimed is:

1. A cryptographic method comprising:
generating, using a vector generating unit, a multidimensional hypercube comprised of members which collectively represent a domain of potential authentication queries;
forming a multidimensional query vector by randomly selecting one corner of said multidimensional hypercube using the vector generating unit;
providing, via a communication unit, the multidimensional query vector to a receiver;
computing, using a function generator unit, a keyed one-way function using the multidimensional query vector and a private key;
receiving a response from the receiver via the communication unit; and
comparing the received response to the computed one-way function using a comparator unit, wherein the selecting is based on a physical source of randomness.

2. The cryptographic method of claim 1, further comprising prepositioning the private key at the receiver.

3. The cryptographic method of claim 1, wherein the keyed one-way function comprises a sine function.

4. The cryptographic method of claim 3, wherein the keyed one-way function comprises a sawtooth function.

5. The cryptographic method of claim 1, further comprising allowing communication between the sender and receiver if the received response matches the computed one-way function.

6. The cryptographic method of claim 1, wherein the physical source of randomness is atmospheric radio noise.

7. A cryptographic system comprising:
a sending device comprising
a vector generator configured to generate a multidimensional hypercube comprised of members which collectively represent a domain of potential authentication queries and to form a multidimensional query vector by selecting a random corner of the multidimensional hypercube based on a physical source of randomness;
a communication module that provides the multidimensional query vector to a receiver and that receives a response from a receiver;
a keyed one-way function generator coupled to the vector generator and the communication module, and the keyed one-way function generator configured to compute a keyed one-way function using the multidimensional query vector and a private key; and
a comparator coupled to the communication module and the keyed one-way function generator, and the comparator configured to determine if the received response matches the computed one-way function.

8. The cryptographic system of claim 7, further comprising:
a receiving device comprising
the communication module, wherein the communication module is configured to receive a multidimensional query vector from the transmitting device and to send the computed response to the transmitting device; and
a response generator and the keyed one-way function generator, each of which is coupled to the communication module and configured to compute a response using the keyed one-way function and the multidimensional query vector and the private key.

9. The cryptographic system of claim 7, wherein the private key is prepositioned at the sending device and the receiving device.

10. The cryptographic system of claim 7, wherein the keyed one-way function comprises a sine function.

11. The cryptographic system of claim 10, wherein the keyed one-way function comprises a sawtooth function.

12. The cryptographic system of claim 7, wherein the physical source of randomness is atmospheric radio noise.

13. A non-transitory computer readable storage medium upon which is embodied a sequence of programmable instructions that when executed by a processor cause the processor to:
generate a multidimensional hypercube comprised of members which collectively represent a domain of potential authentication queries;
form a multidimensional query vector by randomly selecting a corner of said multidimensional hypercube based on a physical source of randomness;
provide the multidimensional query vector to a receiver;
compute a keyed one-way function using the multidimensional query vector and a private key;
receive a response from the receiver;
compare the received response to the computed one-way function.

14. The non-transitory computer readable storage medium of claim 13, wherein the keyed one-way function comprises a sine function.

15. The non-transitory computer readable storage medium of claim 13, wherein the keyed one-way function comprises a sawtooth function.

16. The non-transitory computer readable storage medium of claim 13, further comprising instructions that cause the processor to allow communication between the sender and receiver if the received response matches the computed one-way function.

17. The non-transitory computer readable storage medium of claim 13, wherein the physical source of randomness is atmospheric radio noise.

* * * * *